Figure 1:
Figure 2:
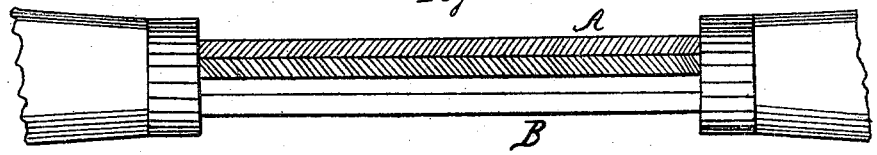
Figure 3:
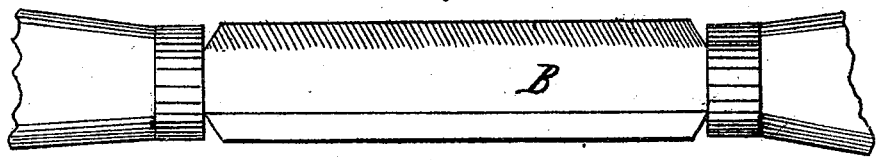

W. M. Jones.
Sharpening Horse-Shoe Calks.
No. 73102          Patented Jan. 7, 1868.

Witnesses          Inventor
F. Lehmann          Wm. M. Jones
H. S. Yeatman          Per
                       Alexander & Mason
                       atty.

United States Patent Office.

WILLIAM M. JONES, OF HORICON, WISCONSIN.

Letters Patent No. 73,102, dated January 7, 1868.

IMPROVEMENT IN DEVICE FOR SHARPENING HORSE-SHOE CALKS.

*The Schedule referred to in these Letters Patent and making part of the same.*

TO ALL WHOM IT MAY CONCERN:

Be it known that I, WILLIAM M. JONES, of Horicon, in the county of Dodge, and in the State of Wisconsin, have invented certain new and useful Improvements in Horse-Shoe-Calk Sharpeners; and do hereby declare that the following is a full, clear, and exact description thereof, reference being had to the accompanying drawings, and to the letters of reference marked thereon.

In the annexed drawings, making part of this specification, A and B represent two pieces of steel, which have their two ends sharpened, to be received into the handles C C. The edges of these pieces are bevelled off in V-shape, and these bevelled edges have files formed upon them. When the two pieces A and B are placed together side to side, their bevelled edges form a V-shaped file-groove between them. These pieces are hardened as files usually are.

This instrument is used for sharpening the heel and toe-calks of horse-shoes while they are on the horse. When the calks become dulled by wear, this instument will give them a sharp cutting-point.

The great advantage of the instrument is that it will sharpen the calks while the shoe is on the horse, thus doing away with the expense of removing the shoe, and preventing damage to the hoof by constant pricking of the nail in resecuring the shoe.

What I claim, is—

The within-described V-shaped file, constructed and used substantially as and for the purpose specified.

In testimony that I claim the foregoing, I have hereunto set my hand, this first day of February, 1867.

WM. M. JONES.

Witnesses:
WM. E. CROFT,
D. W. HALL.